US008592744B2

United States Patent
Van Dalen et al.

(10) Patent No.: US 8,592,744 B2
(45) Date of Patent: Nov. 26, 2013

(54) INDOOR/OUTDOOR DETECTION

(75) Inventors: Rob Van Dalen, Bergeijk (NL); Sergio Masferrer Oncala, Foios (ES)

(73) Assignee: NXP B.V., Eindhoven (NL)

( * ) Notice: Subject to any disclaimer, the term of this patent is extended or adjusted under 35 U.S.C. 154(b) by 498 days.

(21) Appl. No.: 12/670,471

(22) PCT Filed: Jul. 25, 2008

(86) PCT No.: PCT/IB2008/053011
§ 371 (c)(1),
(2), (4) Date: Jan. 25, 2010

(87) PCT Pub. No.: WO2009/013725
PCT Pub. Date: Jan. 29, 2009

(65) Prior Publication Data
US 2010/0187406 A1    Jul. 29, 2010

Related U.S. Application Data

(60) Provisional application No. 60/951,914, filed on Jul. 25, 2007.

(51) Int. Cl.
  *G01J 1/42*   (2006.01)
  *G01J 3/50*   (2006.01)
  *G01J 5/60*   (2006.01)
  *G06F 1/16*   (2006.01)
  *H04M 1/73*   (2006.01)

(52) U.S. Cl.
  USPC ............... 250/226; 250/214 AL; 250/339.05; 356/222

(58) Field of Classification Search
  USPC ..... 250/226, 214 AL, 214 B, 214 AG, 214 D, 250/214 P, 214 R, 208.2, 339.05, 339.01; 356/402, 405, 406, 416, 419, 425, 218, 356/221, 222
  See application file for complete search history.

(56) References Cited

U.S. PATENT DOCUMENTS

| | | | | |
|---|---|---|---|---|
| 3,147,381 A | * | 9/1964 | Lowenstein | 250/349 |
| 4,011,016 A | | 3/1977 | Layne et al. | |
| 4,041,308 A | | 8/1977 | Fujita | |
| 4,238,760 A | * | 12/1980 | Carr | 257/443 |
| 4,914,738 A | * | 4/1990 | Oda et al. | 356/419 |
| 5,048,955 A | * | 9/1991 | Bernhard | 356/213 |

(Continued)

FOREIGN PATENT DOCUMENTS

GB    2034971 A    6/1980

OTHER PUBLICATIONS

Xiaoming, W., "Study on Fluorescent Lamp Illumination and Flicker"; Power Electronics and Drive Systems (PEDS); 2003 p. 1529.

(Continued)

Primary Examiner — John Lee

(57) ABSTRACT

A light sensor is used to detect ambient light conditions. According to an example embodiment, a light sensor (112) detects color temperature and, in some instances, intensity characteristics of ambient light (120, 130, 140) in an environment and uses these detected characteristics (116) to determine the location of the sensor relative to natural and artificial light sources. This location determination is used to selectively operate circuits in a device such as a hand-held telephone, computer device or personal data assistant (PDA).

22 Claims, 5 Drawing Sheets

(56) References Cited

U.S. PATENT DOCUMENTS

| | | | |
|---|---|---|---|
| 5,636,143 A * | 6/1997 | Takahashi | 702/134 |
| 5,666,571 A | 9/1997 | Matsumura | |
| 5,684,294 A | 11/1997 | Kouhi | |
| 5,732,293 A * | 3/1998 | Nonaka et al. | 396/157 |
| 5,796,094 A * | 8/1998 | Schofield et al. | 250/208.1 |
| 5,990,628 A * | 11/1999 | Birrell | 315/151 |
| 6,515,275 B1 * | 2/2003 | Hunter et al. | 250/226 |
| 6,632,701 B2 | 10/2003 | Merrill | |
| 6,787,757 B2 | 9/2004 | Comeau | |
| 6,801,836 B2 * | 10/2004 | Schanin | 700/295 |
| 6,802,631 B1 * | 10/2004 | Hog et al. | 362/464 |
| 6,822,677 B1 * | 11/2004 | Takahashi | 348/223.1 |
| 6,865,293 B2 * | 3/2005 | Sobol et al. | 382/167 |
| 6,989,859 B2 * | 1/2006 | Parulski | 348/223.1 |
| 6,989,860 B2 * | 1/2006 | Hofer et al. | 348/226.1 |
| 7,009,642 B2 * | 3/2006 | Hofer et al. | 348/226.1 |
| 7,075,079 B2 * | 7/2006 | Wood | 250/332 |
| 7,115,850 B2 * | 10/2006 | Niemann et al. | 250/203.4 |
| 7,157,710 B1 * | 1/2007 | Shannon | 250/339.05 |
| 7,206,072 B2 * | 4/2007 | Takahashi et al. | 356/406 |
| 7,288,755 B1 * | 10/2007 | Fassbender et al. | 250/221 |
| 7,336,314 B2 * | 2/2008 | Yamada | 348/371 |
| 7,446,303 B2 * | 11/2008 | Maniam et al. | 250/226 |
| 7,495,204 B2 * | 2/2009 | Zhang et al. | 250/214 AL |
| 7,646,974 B2 * | 1/2010 | Wernersson | 396/164 |
| 7,680,342 B2 * | 3/2010 | Steinberg et al. | 382/224 |
| 7,714,265 B2 * | 5/2010 | Fadell et al. | 250/214 AL |
| 7,777,166 B2 * | 8/2010 | Roberts | 250/205 |
| 7,796,948 B2 * | 9/2010 | Grosspietsch et al. | 455/62 |
| 7,830,560 B2 * | 11/2010 | Smith et al. | 358/475 |
| 7,856,152 B2 * | 12/2010 | Diederiks et al. | 382/274 |
| 7,960,807 B2 * | 6/2011 | Lin et al. | 257/440 |
| 7,968,835 B2 * | 6/2011 | Tsai | 250/214 AL |
| 2003/0009264 A1 * | 1/2003 | Schanin | 700/291 |
| 2004/0105264 A1 * | 6/2004 | Spero | 362/276 |
| 2004/0119977 A1 * | 6/2004 | Takahashi et al. | 356/406 |
| 2005/0083293 A1 * | 4/2005 | Dixon | 345/102 |
| 2006/0146330 A1 * | 7/2006 | Maniam | 356/405 |
| 2007/0247414 A1 * | 10/2007 | Roberts | 345/102 |
| 2008/0075447 A1 * | 3/2008 | Wernersson | 396/155 |
| 2008/0146153 A1 * | 6/2008 | Grosspietsch et al. | 455/62 |
| 2008/0179497 A1 * | 7/2008 | Maniam et al. | 250/214 AL |
| 2008/0246950 A1 * | 10/2008 | Ono | 356/51 |
| 2008/0303918 A1 * | 12/2008 | Keithley | 348/223.1 |
| 2008/0303922 A1 * | 12/2008 | Chaudhri et al. | 348/231.99 |
| 2009/0224693 A1 * | 9/2009 | Mukai et al. | 315/295 |
| 2009/0278032 A1 * | 11/2009 | Tilmann et al. | 250/214 AL |
| 2010/0038543 A1 * | 2/2010 | Toda et al. | 250/339.05 |
| 2010/0187406 A1 * | 7/2010 | Van Dalen et al. | 250/214 AL |
| 2012/0098439 A1 * | 4/2012 | Recker et al. | 315/152 |

OTHER PUBLICATIONS

Chang, W.N.; "The Influence of Voltage Flicker on Residential Lamps"; Power Electronics and Drive Systems (PEDS); 1997; p. 392.

Braun, J.; "Design of a Lamp Chamber for the Characterisation of Flicker Behaviour of Lamps"; AUPEC; 2005; Paper S08.1.

Schmidt, A., et al; "There Is More to Context Than Location"; Computers and Graphics; Elsevier; GB; vol. 23, No. 6; Dec. 1, 1999; pp. 893-901.

http://www.lightsearch.com/resources/lightguides/ballasts.html, (2012).

* cited by examiner

| ENVIRONMENT | COLOR TEMP. <4K | COLOR TEMP. >6.5K | AC FLUCTUATIONS 100/120Hz | INTENSITY >4KLux |
|---|---|---|---|---|
| OUTDOOR SUNLIGHT | | | | ✓ |
| INDOORS, ILLUMINATED BY:<br>• ORDINARY LIGHT BULB | ✓ | | | |
| • CCFL (ELECTROMAGNETIC BALLAST) | | ✓ | ✓ | |
| • CCFL (ELECTRONIC BALLAST) | | ✓ | ✓ | |
| • COMBINATION FLUORESCENT/ INCANDESCENT | ? | ? | ✓ | |

IF DETECTED (✓) → INDOORS. IF DETECTED (✓) → OUTDOORS.
SAME FOR ?, BUT QUESTIONABLE WHETHER DETECTABLE

FIG. 5

INDOOR/OUTDOOR DETECTION

This patent document relates to electronic devices, and more particularly, to light-based control of electronic devices.

Portable electronic devices have become increasingly popular in recent years. As this popularity has risen, so has the demand for functionality in these devices. For instance, hand-held devices such as PDA's, mobile phones, GPS devices or MP3 players have become equipped with ever more features. In addition, many portable devices are capable of communicating using two or more communication approaches such as those involving wireless internet (Wi-Fi) connections, Bluetooth® connections, wireless telephone connections and others.

As all of these features require power for operation, the demand upon power requirements for these devices has increased with increasing functionality. Correspondingly, the battery lifetime of these devices tends to decrease as increased power demands are placed upon them. In many applications, battery lifetime is an important feature for portable electronic equipment, and in particular, for hand-held devices that are often desirably used for extended periods of time. Providing sufficient power to facilitate increased functionality in portable electronic devices while maintaining a desirable battery life has presented increasing challenges.

The present invention is directed to overcoming the above-mentioned challenges and others related to the types of applications discussed above and in other applications. These and other aspects of the present invention are exemplified in a number of illustrated implementations and applications, some of which are shown in the figures and characterized in the claims section that follows.

Various example embodiments relate to detecting ambient light conditions and using the detected conditions to detect or determine the presence of artificial light and/or natural light and, therefrom, to determine a location to be an indoor or outdoor location.

According to a more particular example embodiment of the present invention, a sensor arrangement is used to controlling the operation of an electronic device. The arrangement includes a light sensor circuit and a controller circuit. The light sensor circuit provides a color output in response to the color temperature of light incident upon the light sensor circuit. The controller circuit determines the presence of artificial light using the color output, and selectively operates circuits in the electronic device in response to the determination.

According to another example embodiment of the present invention, an indoor/outdoor electronic control circuit arrangement selectively controls indoor and outdoor electrical functionality of a portable electronic device. The arrangement includes an ambient light sensor arrangement and a control circuit. The sensor provides color and intensity data in response to ambient light. The control circuit receives and processes the color and intensity data to generate an indoor control signal for operating the portable electronic device under indoor conditions, and to generate an outdoor control signal for operating the portable electronic device under outdoor conditions.

According to another example embodiment of the present invention, an electronic device is controlled according to ambient light conditions. The presence of at least one of artificial light and natural light is detected. In response to the step of detecting, the location of the electronic device is determined as being either an indoor location or an outdoor location, consistent with the detection of predominantly artificial light (i.e., indoors) or predominantly natural light (i.e., outdoors). A first set of circuits in the electronic device is operated in response to determining that the location of the electronic device is an indoor location. A second set of circuits in the electronic device is operated in response to determining that the location of the electronic device is an outdoor location.

The above summary is not intended to describe each illustrated embodiment or every implementation of the present invention. The figures and detailed description that follow more particularly exemplify these embodiments.

The invention may be more completely understood in consideration of the following detailed description of various embodiments of the invention in connection with the accompanying drawings, in which:

FIG. 5 shows a graph for an approach to determining location based upon sensor inputs, according to another example embodiment of the present invention.

Figure 1:
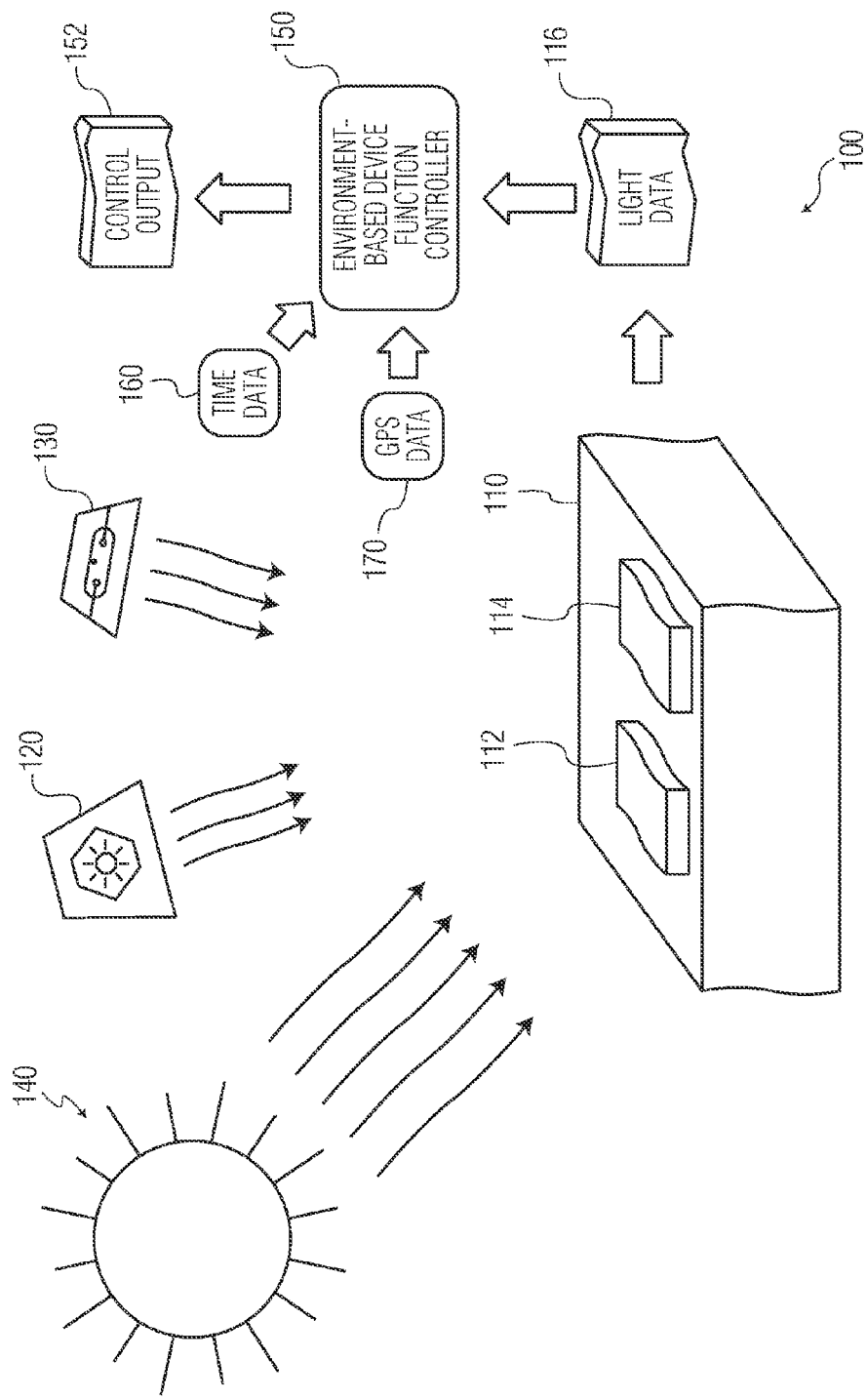
FIG. 1 shows an ambient light detection system for electronic device control, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention, including that defined by the appended claims.

The present invention is believed to be applicable to a variety of electronic circuits, devices and approaches including, for example, portable electronic devices that benefit from location-based control. While the present invention is not necessarily limited to such applications, an appreciation of various aspects of the invention is best gained through a discussion of examples in such an environment.

According to an example embodiment of the present invention, sensor and processing circuits facilitate the detection of artificial (e.g., man-made) light for operation of an electronic device. The sensor circuit includes one or more sensors, and the processor circuit processes, or interprets, electrical outputs from the sensor circuit that are used to characterize ambient light in the sensor's environment. In certain applications, this detection approach facilitates the detection of indoor or outdoor conditions by distinguishing artificial light sources that are common to indoor environments, relative to natural light that is common to outdoor environments.

The detection of artificial light (i.e., or the lack of artificial light) in ambient light is used, for example, to enable or disable certain services such as GPS or home based networks. This approach is helpful for preserving power by disabling unused functions, which is useful for a variety of applications. For example, devices employing GPS functions generally execute frequent updates of GPS coordinates; when the detected characteristics are indicative of the device being located indoors, the GPS functions are not needed and thus disabled to save power. As another example, where devices are capable of connecting to robust indoor networks such as Wi-Fi networks, back-up connection strategies can be reduced in function or disabled to save power as well.

In a more particular embodiment, the sensor circuit generates a distinct response to different wavelengths of light using, for example, different sensor circuits respectively configured to respond to light having a wavelength in different ranges of wavelengths. The separate responses are used to characterize the color temperature of light to which the sensor is exposed. This characterization of the color temperature is used to detect the presence of artificial light and, correspondingly, to determine location characteristics of the sensor.

In some applications, light sensors used to characterize color temperature include photodiodes that are differently responsive to light of different wavelengths based upon characteristics of the photodiodes and/or their implementation. For instance, some applications are directed to the implantation of photodiodes at different depths in a silicon-based sensor arrangement, using depth-based filtering characteristics of the silicon to operate the photodiodes in a manner that is responsive to different wavelengths of light. Other applications are directed to the use of different filtering approaches such that light of a particular wavelength is filtered from reaching a particular sensor; example filters for such applications include a color filters and a metal grid filter. Still other applications are directed to the use of a stacked photodiode structure with a lower photodiode located in a substrate below an upper photodiode such that light reaching the lower photodiode is filtered by one or more of the substrate and the upper photodiode.

In another example embodiment, a light sensor arrangement detects color and intensity characteristics in the environment to which the light sensor is exposed. These detected characteristics are used together to determine the presence of artificial-based light conditions of the environment (e.g., by detecting characteristics attributable to artificial light sources). The intensity characteristics used to detect artificial light may include, for example, ambient lux level and artificial intensity variation that results from power characteristics (e.g., 50/60 Hz components).

Turning now to the figures, FIG. 1 shows an arrangement 100 for detecting artificial and natural light characteristics to control circuits in an electronic device, according to another example embodiment of the present invention. A light detector circuit 110 implements sensor 112 to generate light data 116 in response to light from one or more artificial and/or natural light sources. By way of example, artificial light sources including an incandescent light 120 and a fluorescent light 130 are shown, as is a natural light source 140 (i.e., the sun).

The light data 116 is received and used by an environment-based device function controller 150 to generate a device operation control output 152 that is used to control the selective operation of electronic circuits in an electronic device such as a portable telephone, digital media player or PDA. Generally, the control output 152 is used to operate indoor-based circuits in response to the light data 116 being indicative of artificial light, and to operate outdoor-based circuits in response to the light data 116 being indicative of the presence of natural light (or a predominance of natural light).

The artificial light detection circuit 110 is used to detect different ambient light characteristics, depending upon the application. The following discussion characterizes examples involving the detection of the light sources 120, 130 and 140 as shown by way of example. For these examples, the sensor 112 is implemented as one or both of an intensity-based sensor and a color temperature sensor, and may include more than one sensor circuits. For instance, in many applications, the sensor 112 includes two (or more) different photodiodes, each having a different wavelength response that can be compared or otherwise processed to indicate the color temperature of ambient light. To this end, certain applications are directed to the use of two photodiodes, the first of which having a response that is predominantly in the visible spectrum and the second of which having a response that is predominantly in the infrared spectrum. For certain applications involving two photodiodes, the sensor 112 is implemented in a manner that is similar to the sensor 200 shown in and described in connection with FIG. 2.

The sensor 112 is used in different manners to detect the presence of artificial light and/or natural light. For instance, the presence of sunlight (natural light) is a good indicator of an outdoor environment because the intensity of sunlight is very high when compared to common man-made (artificial) light sources. As an example, a traditional 100 W reflector bulb produces about 2 kLux, even when measured in the center of a beam from the reflector bulb at a small distance (e.g., one meter). In contrast, sunlight can be as bright as 100 kLux on a bright sunny day, and often is 7 kLux on cloudy day.

As the presence of sunlight is a good indicator of an outdoor environment, so is the presence of intensity fluctuation a good indicator of an indoor environment. The presence of alternating current circuits cause fluctuation in light produced by artificial sources such as light sources driven by electromagnetic ballasts (e.g., halophosphor lamps) and incandescent lights. The relatively high response-time of these light sources in combination with their relatively simple driving circuitry means that they behave much like an ohmic load that is directly connected to an AC power supply. For general information regarding light variation, and for specific information regarding light variation as can be used to detect the presence of artificial light in connection with one or more example embodiments, reference may be made to W. Xiaoming, *Study on fluorescent lamp illumination and flicker*, Power Electronics and Drive Systems (PEDS), 2003, p. 1529; to W. N. Chang, *The influence of voltage flicker on residential lamps*, Power Electronics and Drive Systems (PEDS), 1997, p. 392; and to J. Braun, *Design of a lamp chamber for the characterisation of flicker behaviour of lamps*, AUPEC, 2005, paper S08.1; each of which is fully incorporated herein by reference.

When the light detector circuit 110 is located in an indoor environment exposed to incandescent light 120 (or fluorescent light 130) that is sensitive to power fluctuation, the sensor 112 detects fluctuation in the intensity of light output by the light due to AC variation in the power supplied to the light. An AC bandpass filter 114 is used in certain applications involving the detection of AC variations as exemplified in intensity variation. In some applications involving the detection of intensity variation with fluorescent light sources, such as with fluorescent lamps having electronic ballasts, the output of the sensor 112 is passed through a band-bass component in the artificial light detector circuit 110 to filter out a DC (direct current) component of the output. The light detector circuit 110 generates light data 116 that represents this intensity fluctuation, which is used by the environment-based device function controller 150 to determine that the light detection circuit is located indoors. Correspondingly, the environment-based device function controller 150 generates a control output 152 to control the operation of an electronic device for indoor use, such as by disabling outdoor-based GPS features and enabling indoor-based wireless network features.

When the light detector circuit 110 is exposed to a natural light source 140 (sunlight) in an outdoor environment, the sensor 112 detects a light intensity that is attributable to sunlight (e.g., greater than about 4 kLux). The light detector circuit 110 generates light data 116 that corresponds to this intensity and is thus not indicative of artificial light or, if artificial light is also present, is indicative of the presence of both natural and artificial light. When the sensor 112 does not detect such an intensity attributable to natural light, another approach is generally used to determine the location of the light detector circuit (and the device in which it is employed).

The sensor 112 is also used in different manners to detect the presence of artificial light and/or natural light relative to color temperature. Generally, direct sunlight has a color temperature of about 6000K, or in a range of about 5500K to 6500K. Common incandescent light bulbs have a much lower color temperature of just 2800K, and certain fluorescent light sources emit primarily in the visible range, which effectively corresponds to a very high color temperature (e.g., on the order of about 8000K). Table 1 below shows example color temperatures for different light sources that are detected using the approaches described herein, in connection with various example embodiments.

TABLE 1

Color temperatures of example light sources

| Color temperature (K) | Source |
|---|---|
| 1850 K | Candle |
| 2800 K | Incandescent light bulb |
| 3400 K | Studio photo lamps |
| 5500-6500 K | Daylight |

The color temperature has a large impact on the relative amount of infrared photons versus the actual visual light emitted by a light source, as described by Planck's law. The low color temperature of a traditional incandescent light bulb corresponds to the emission of relatively large amounts of invisible infrared photons and explains its low efficiency. In contrast, efficient fluorescent lamps emit virtually no infrared photons and their overall emission (so not limited to the eye) can be classified as 8000K or higher.

When the light detector circuit 110 is exposed to artificial light, the sensor 112 is responsive to the color temperature of artificial light and the light detector circuit generates light data 116 that is indicative of this color temperature. Where incandescent light is present, the sensor 112 is accordingly responsive to indicate light having a relatively low color temperature (e.g., less than about 5500K), which can be indicative of the presence of infrared light commonly associated with artificial incandescent light sources. Where certain fluorescent light is present, sensor 112 is accordingly responsive to indicate light having a relatively higher color temperature (e.g., greater than about 6500K). Where natural light is present, the sensor 112 is accordingly responsive to indicate light having a color temperature in a range corresponding to natural light, of between about 5500K and about 6500K.

Considering the above, the light data 116 indicates the presence of an artificial light source when the detected color temperature of light is lower or higher than a range associated with natural light (e.g., between about 5500K and 6500K), which can be used to identify the location of the light detector circuit 110 as an indoor location. Correspondingly, when the light data 116 is indicative of light having a color temperature in the aforesaid range of natural light (e.g., and the absence of light having a lower or higher color temperature), the data can be used to identify the location of the light detector circuit 110 as an outdoor location.

In some applications, a combination of characteristics as discussed above is used to determine whether the light detector circuit 110 is located in an environment having one or more light sources that are difficult to characterize as artificial or natural. For example, intensity variation and color temperature data as provided by the sensor 112 can be used to determine the location of the light detector circuit 110 using a combination of the above-discussed approaches. For instance, indoor environments may be exposed to artificial light as well as natural light; in such situations, detecting the presence of natural light (e.g., via color temperature) may be insufficient for determining the location of the light detector circuit 110. Supplemental information, such as that indicative of intensity variation in light associated with electromagnetic ballast and/or incandescent light sources can be used to better characterize the location of the light detector circuit 110.

In some example embodiments, the environment-based device function controller 150 generates the control output 152 in response to the light detector circuit 110 generally as described above, and further using time data 160 characterizing the time of day. This time characterization can be used to determine whether natural light is expected to be present or whether an indoor or outdoor location is probable given, for example, preferences and/or behavior patterns associated with a user of the electronic device being controlled. In these embodiments, the environment-based device function controller 150 generates a control output 152 to operate a device using the time of day. In some applications, the environment-based device function controller 150 disables any control output 152 after a certain time of day corresponding to a nighttime condition. Disabling the control output 152 is useful to prohibit an inaccurate determination of an indoor lighting condition where artificial lighting is used outdoors.

In some embodiments involving a transition from a light condition to a low-light or no-light condition, the environment-based device function controller 150 issues a prompt that is communicated to a user via the electronic-based device being controlled. The prompt requests confirmation of an indoor or outdoor location, and the environment-based device function controller 150 either responds to the prompt or operates in response to light detected at a later time (when no response to the prompt is made). This approach is useful in night time situations in order to distinguish between a user moving his or her electronic device from an artificially-lit indoor location to an outdoor location, and an indoor condition where artificial lights have been turned off or the device has been placed in an enclosure such as a briefcase or closet. If the user does not respond to the prompt, the environment-based device function controller 150 continues to operate the device under prior conditions. These transition-based approaches may also implement a time-based control as described above.

In another example embodiment involving operation of a device employing GPS circuits under either night time conditions and further selectively using time data as discussed above, the environment-based device function controller 150 uses GPS data 170 from GPS circuits when light conditions are insufficient for determining an indoor or outdoor location. For example, when detected light conditions are indicative of low-light or no-light conditions between sunset and sunrise, the environment-based device function controller 150 uses a detected GPS signal and/or GPS signal strength to determine whether the device is indoors or outdoors. In some applications, the environment-based device function controller 150 interacts with the electronic device being controlled to operate to detect the presence and/or strength of a GPS signal to generate the GPS data 170. In this regard, when no GPS signal or a low-strength GPS signal is detected, an indoor condition is determined; correspondingly when a GPS signal is detected, an outdoor condition is determined. With these approaches, the environment-based device function controller 150 supplements the light data 116 with the GPS information to generate the control output 152.

Figure 2:
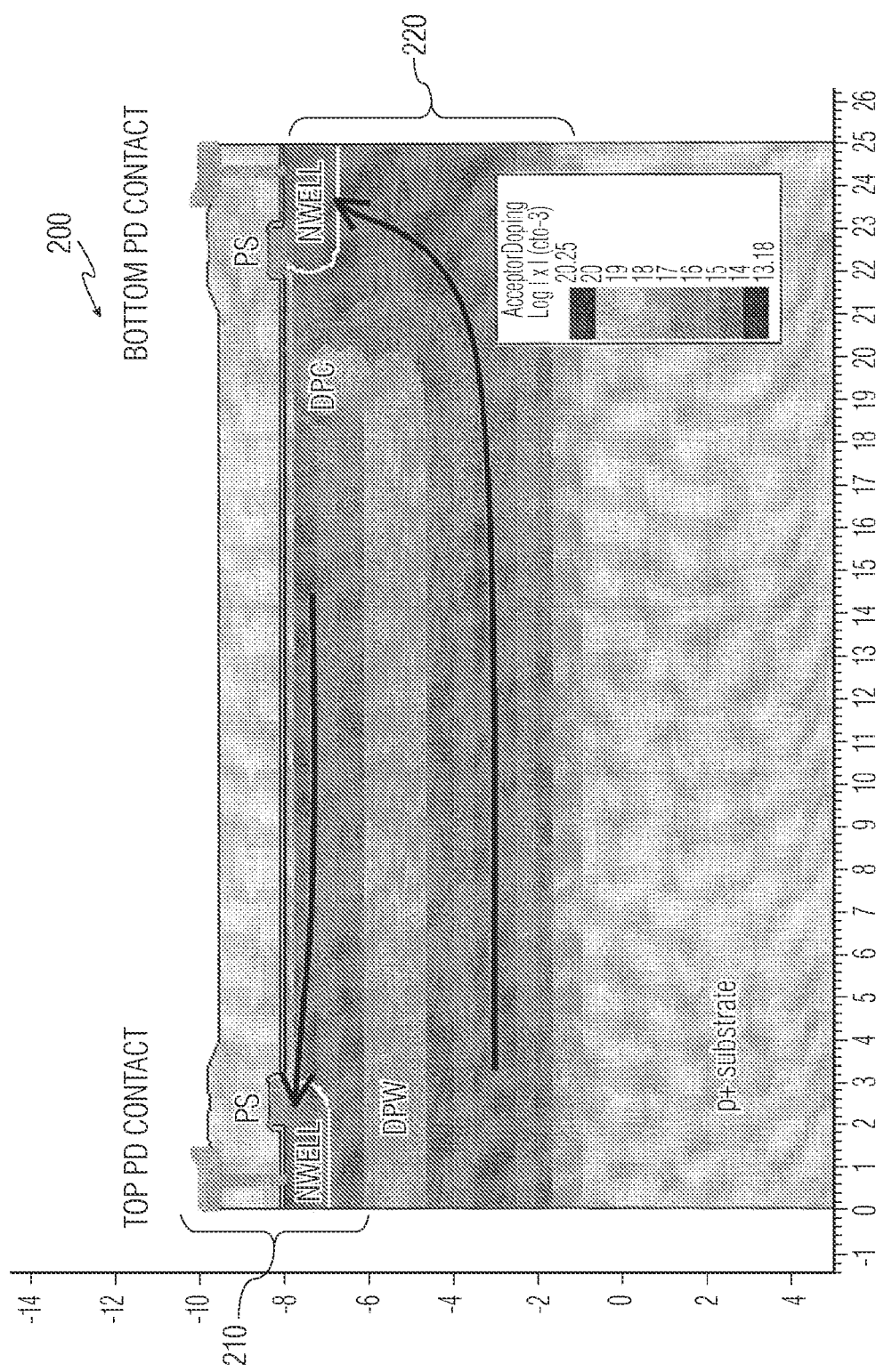
FIG. 2 shows a photodiode arrangement for electronic device control, according to another example embodiment of the present invention.

As discussed above, a variety of color temperature sensors and sensor approaches are implemented in connection with various embodiments, including those discussed in connection with FIG. 1. FIG. 2 shows an example of such a sensor 200 employing two photodiodes, in accordance with another example embodiment of the present invention. The sensor 200 is a CMOS-based semiconductor circuit that includes two diodes of which the top or upper photodiode 210 closest to the surface is electrically shielded from a deeper lying bottom or lower photodiode 220 by a buried p+ layer (DPW) and laterally by a p+ plug (DPC). In some applications, both cathodes are implemented as a gated diode to reduce or minimize the leakage current.

The top photodiode 210 is generally responsive to visible light and acts as a filter, passing mainly infrared light to the bottom photodiode 220, which is correspondingly responsive to infrared light. The filtering effect of the top photodiode 210 can be tailored for certain applications, using silicon as the substrate in which the photodiode is formed with blue light penetrating silicon to a depth that is less than about 0.5 μm and red light penetrating several micrometers into the silicon. Infrared light has a deep penetration depth of more than about 10 μm, thus is detected with the bottom photodiode 220. In some applications, the top photodiode 210 is manufactured to respond predominantly to light in the visible spectrum, and the bottom photodiode 220 is manufactured to respond predominantly to light in the IR spectrum.

In this regard, various embodiments are directed to the positioning of the top photodiode 210 within about 2 μm of the upper surface to collect photo-generated charge between top surface and the 2 μm depth to detect light in the visible spectrum. The bottom photodiode is located deeper into the silicon substrate to collect photo-generated charge below the 2 μm depth of the top photodiode, facilitating the detection of light in the IR spectrum.

Figure 3:
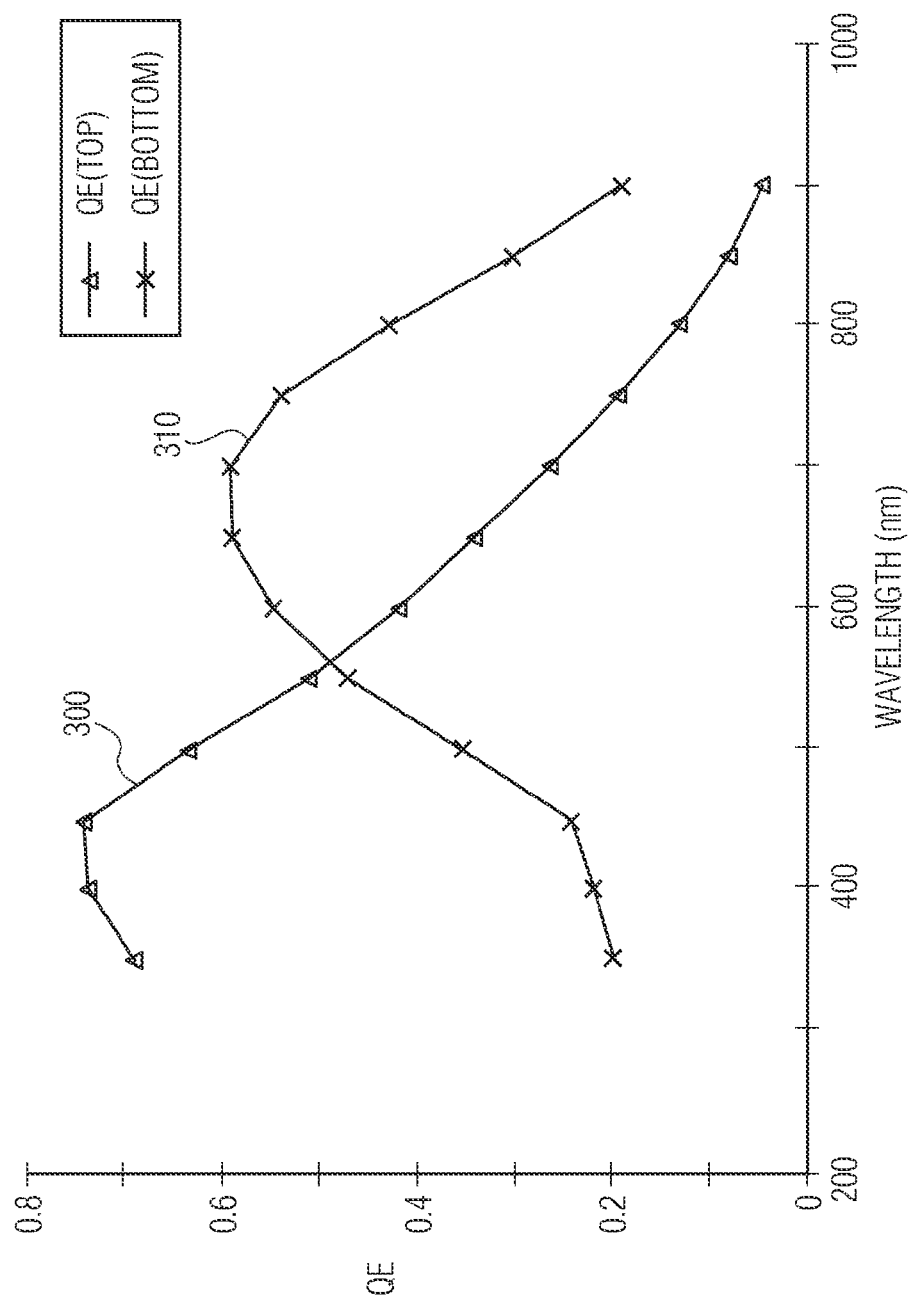
FIG. 3 shows a plot for an approach to wavelength-based location detection, according to another example embodiment of the present invention.

FIG. 3 shows a plot of the response of stacked photodiode system with upper (plot 300) and lower (plot 310) photodiodes in a two-diode arrangement such as shown in FIG. 2 and operated in connection with another example embodiment of the present invention. Wavelength in nanometers (nm) is shown on the horizontal axis and quantum efficiency (QE) is shown on the vertical axis. The ratio of both responses is used to detect or determine color temperature of incident light and, accordingly, to facilitate the detection of natural and/or artificial light for determining the location of the photodiodes. Light sources having a relatively high color temperature predominantly emit in the visible spectrum and much less in the infrared (IR) spectrum, resulting in a relatively low ratio between output of the lower (IR-sensitive) and upper (visible-sensitive) photodiode. In contrast, an inefficient light source such as incandescent bulbs emit a relatively significant amount of light in the IR spectrum, resulting in a relatively high ratio in between the output of these diodes.

Figure 4:
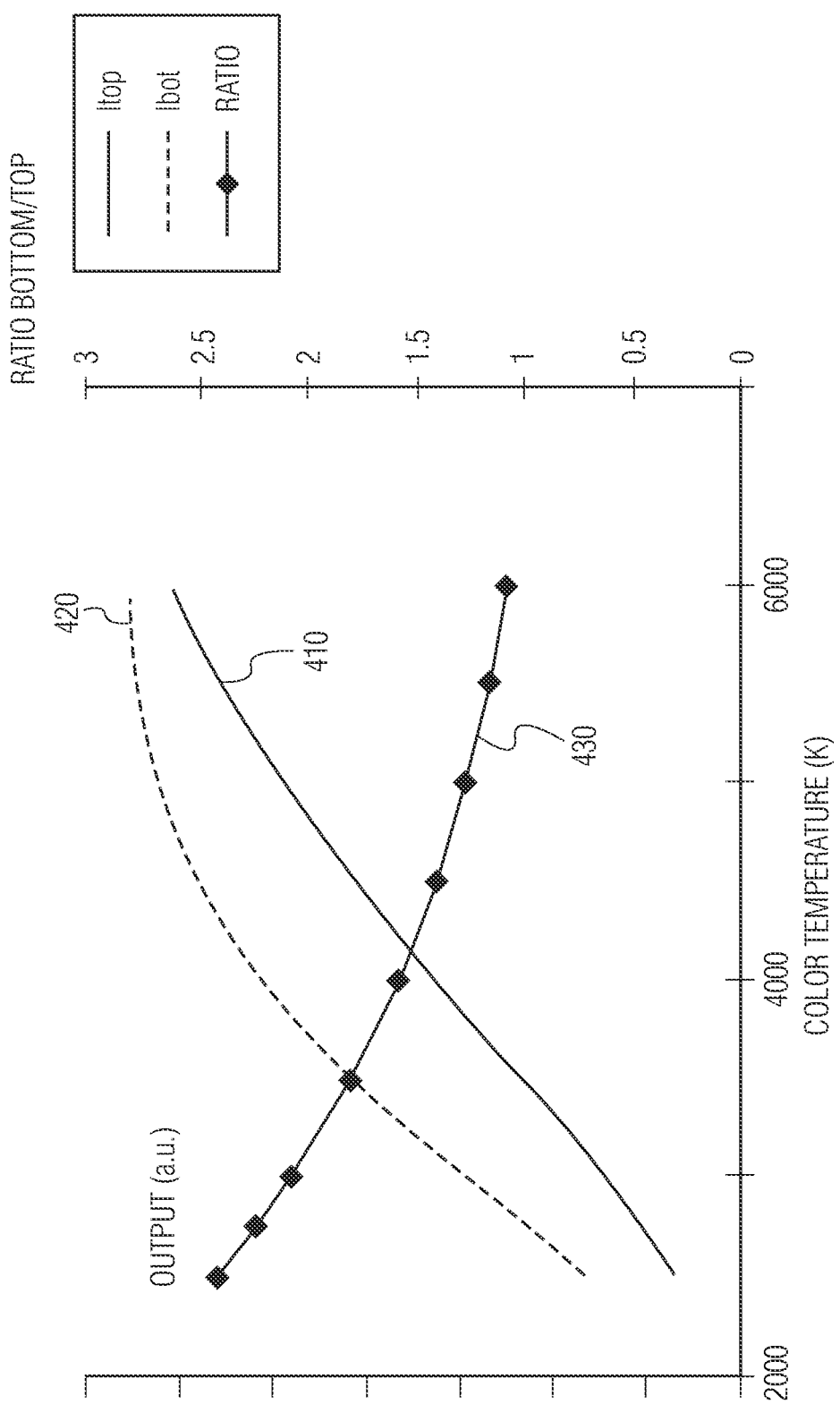
FIG. 4 shows a plot for an approach to color temperature-based location detection, according to another example embodiment of the present invention.

FIG. 4 shows plots of example output values for a sensor arrangement exhibiting light response characteristics consistent with those shown in FIG. 3, according to another example embodiment of the present invention. Color temperature is shown on the horizontal axis and the corresponding ratio between the output values is shown on the vertical axis. Plot 410 represents the output of a top sensor (visible light) and plot 420 represents the output of a lower sensor (IR light). Plot 430 shows the ratio between the plots 410 and 420, showing a decrease in ratio with an increase in color temperature. This ratio between the two diodes can be used to determine the color temperature of incident light. Such an approach is applicable, for example, with a sensor arrangement such as that shown in and described in connection with FIG. 1.

FIG. 5 shows a table and approach 500 for determining the location of a light sensor, according to another example embodiment of the present invention. This table is used, for example, in connection with sensors that detect intensity and color temperature characteristics of light in a particular environment to determine whether the sensor is located in an indoor or outdoor environment. For instance, referring back to FIG. 1, for certain embodiments, the environment-based device function controller 150 implements a programmed algorithm consistent with the table shown in FIG. 5 to process the light data 116 in order to generate a control output 152.

The table in FIG. 5 includes columns depicting indoor and outdoor environments with corresponding color temperature, AC fluctuations (intensity fluctuation) and intensity values indicated for each. A sensor arrangement is used to determine whether one or more of the following conditions are met: a color temperature of less than 4000K; a color temperature of greater than 6500K; the presence of intensity fluctuation (100/120 Hz shown by way of example); and intensity of greater than 4 kLux.

When an intensity of greater than 4 kLux is detected, the sensor is determined to be in an outdoor sunlight environment and this information is used to operate device functions accordingly (e.g., to turn on GPS or other functions as described above). When light having a color temperature of less than 4000K, greater than 6500K, or exhibiting AC fluctuations is detected, the sensor is determined to be in an indoor environment and this information is used to operate device circuits accordingly (e.g., to turn GPS circuits off and Wi-Fi network circuits on). As shown in the table, example indoor light environments include those illuminated with an incandescent light source, with a cold-cathode fluorescent lamp (CCFL) source having electromagnetic or electronic ballast, or with a combination of incandescent and fluorescent light sources.

Where implemented in an algorithm for controlling device circuit operation, in the context of FIG. 5 and the three measurements of color temperature, intensity fluctuation and intensity, an indoor or outdoor environment is detected as follows: an outdoor environment is detected in response to detecting light intensity that is greater than about 4 kLux; an indoor environment is detected in response to detecting either intensity fluctuations, or a color temperature that is either less than 4000K or greater than 6500K.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such modifications and changes do not depart from the true scope of the present invention.

The invention claimed is:

1. For use in controlling the operation of an electronic device, a sensor arrangement comprising:

a light sensor circuit configured and arranged to provide at least one output corresponding to an intensity of light incident upon the light sensor circuit, the light sensor circuit including:
   a first light sensor configured and arranged to respond predominantly to light incident upon the light sensor circuit and in the visible spectrum, and
   a second light sensor configured and arranged to respond predominantly to light incident upon the light sensor circuit and in the infrared spectrum; and
a controller circuit configured and arranged to
   determine the presence of artificial light based upon the at least one output, by
      determining a ratio between a response of the first light sensor and a response of the second light sensor,
      determining a color temperature of light incident on the light sensor circuit based upon the determined ratio,
      filtering, for light incident on the light sensor circuit, direct current (DC) components of light intensity variations from the at least one output of the light sensor circuit to produce a filtered output, and
      detecting, using the filtered output, the presence of an artificial source by correlating variations in the intensity, for light incident on the light sensor circuit, to variations in intensity resulting from a corresponding type of artificial source, and
   selectively operate circuits in the electronic device in response to determining the presence of artificial light.

2. The sensor arrangement of claim 1, wherein the controller is configured and arranged to:
   provide an indication that artificial light is present in response to the determined color temperature of light incident on the light sensor circuit being less than 4000K;
   provide an indication that artificial light is present in response to the determined color temperature of light incident on the light sensor circuit being greater than 6500K;
   provide an indication that artificial light is present in response to detecting, using the variation in intensity in the filtered output having a frequency of 100-120 Hz; and
   provide an indication that artificial light is present in response to the first and second sensors indicating a light intensity greater than 4 kLux.

3. The sensor arrangement of claim 1, wherein the controller circuit determines the presence of artificial light by using the at least one output to determine that the incident light has a color temperature that is greater than the color temperature of natural light.

4. The sensor arrangement of claim 1, wherein the controller circuit determines the presence of natural light by using the at least one output to determine that the incident light has a color temperature that is greater than a color temperature of incandescent light and less than a color temperature of fluorescent light.

5. The sensor arrangement of claim 1, wherein the controller circuit
   determines a location of the light sensor circuit to be an indoor location or an outdoor location in response to the determined presence of artificial light,
   operates a first set of circuits in the electronic device for indoor use in response to determining that the sensor is located at an indoor location, and
   operates a second set of circuits in the electronic device for outdoor use in response to determining that the sensor is located at an outdoor location.

6. The sensor arrangement of claim 1, wherein the a light sensor circuit provides an intensity output indicative of the intensity of light incident upon the light sensor circuit, and wherein the controller circuit
   determines the presence of at least one of artificial light and natural light, using the intensity indicated via the intensity output and
   selectively operates circuits in the electronic device in response to the determination.

7. The sensor arrangement of claim 1, wherein the controller circuit
   determines the presence of artificial light by using the at least one output to detect the presence of a frequency component that corresponds to a frequency of an alternating current source that provides power to an artificial light source, and
   selectively operates circuits in the electronic device in response to the determination of the presence of artificial light.

8. The sensor arrangement of claim 1, wherein the light sensor circuit provides an intensity output indicative of the intensity of light incident upon the light sensor circuit, and wherein the controller circuit is configured and arranged to perform the steps of the determination of the ratio, the determination of the color temperature, filtering, and detecting in response to the
   intensity output being less than an expected intensity of natural light.

9. The sensor arrangement of claim 1, wherein the light sensor circuit provides an intensity output indicative of the intensity of light incident upon the light sensor circuit, and wherein the controller circuit
   determines the presence of artificial light by using the intensity output to detect at least one of: the variation in intensity and an intensity of incident light that is less than an expected intensity of natural light, and
   selectively operates circuits in the electronic device in response to the determination.

10. The arrangement of claim 1, wherein the first light sensor is configured and arranged to filter visible light from reaching the second light sensor and wherein the first and second light sensors each include a photodiode.

11. An indoor/outdoor electronic control circuit arrangement to selectively control indoor and outdoor electrical functionality of a portable electronic device, the arrangement comprising:
   an ambient light sensor arrangement configured and arranged to provide, for ambient light, color and intensity data indicative of variations in intensity; and
   a control circuit to receive and process the color and intensity data to generate an indoor control signal for operating the portable electronic device under indoor conditions in response to the intensity, and to generate an outdoor control signal for operating the portable electronic device under outdoor conditions.

12. The arrangement of claim 11, wherein the control circuit generates
   an indoor control signal by identifying the presence of an artificial light source subject to alternating current fluctuations in response to the intensity data being indicative of intensity fluctuation, and
   an outdoor control signal in response to at least one of the intensity data being indicative of ambient light intensity that is greater than a predefined threshold that corresponds to an expected intensity of artificial light, and the color data being indicative of ambient light color temperature that is in a range of color temperatures that is between color temperatures respectively associated with infrared light and with fluorescent light.

13. The arrangement of claim 11, wherein the control circuit generates an indoor control signal in response to the intensity data indicating cyclic fluctuation in intensity, and an outdoor control signal in response to the intensity data indicating that the intensity of the ambient light is greater than about 4 kLux, or the color data indicating that the color temperature of the ambient light is between about 4000K and 6000K.

14. The arrangement of claim 11, wherein the ambient light sensor arrangement includes a visible light sensor selectively responsive to visible light and an infrared light sensor selectively responsive to infrared light.

15. The arrangement of claim 11, wherein the ambient light sensor arrangement includes a bottom photodiode that is predominantly responsive to infrared light, and a top photodiode that is predominantly responsive to visible light, and that filters light passed to the bottom photodiode.

16. The arrangement of claim 11, wherein the control circuit is responsive to time data indicating a night time condition by disabling the generation of the control signals.

17. The arrangement of claim 11, wherein the control circuit is responsive to time data indicating a night time condition by using GPS data characterizing a GPS signal to determine the location of the portable electronic device as either an indoor location or an outdoor location, generating an indoor control signal for operating the portable electronic device under indoor conditions in response to determining that the location is an indoor location, and generating an outdoor control signal for operating the portable electronic device under outdoor conditions in response to determining that the location is an outdoor location.

18. A method for controlling the operation of an electronic device according to ambient light conditions, the method comprising:

detecting the presence of at least one of artificial light and natural light based upon light color and variations in light intensity;

in response to the step of detecting, determining the location of the electronic device as being one of: an indoor location and an outdoor location;

operating a first set of circuits in the electronic device in response to determining that the location of the electronic device is an indoor location; and operating a second set of circuits in the electronic device in response to determining that the location of the electronic device is an outdoor location.

19. The method of claim 18, wherein the step of detecting includes detecting a color temperature that is in a range of color temperatures attributable to artificial light, and the step of determining includes determining that the electronic device is located indoors.

20. The method of claim 18, wherein the step of detecting includes using a first sensor circuit to detect light having a wavelength in a first range of wavelengths, and using a second sensor circuit to detect light having a wavelength in a second range of wavelengths, and the step of determining includes using outputs from the first and second sensor circuits to determine a color temperature of the detected light.

21. The method of claim 18, wherein the step of detecting includes detecting intensity variation in artificial light and the step of determining includes determining that the source of the detected light includes an alternating current source.

22. The method of claim 18, wherein the step of detecting includes detecting intensity, intensity fluctuation due to an alternating current light source, and color characteristics of ambient light.

* * * * *